Oct. 31, 1961 W. C. F. HESSENBERG Re. 25,075
ROLLING MILLS
Original Filed Jan. 25, 1955
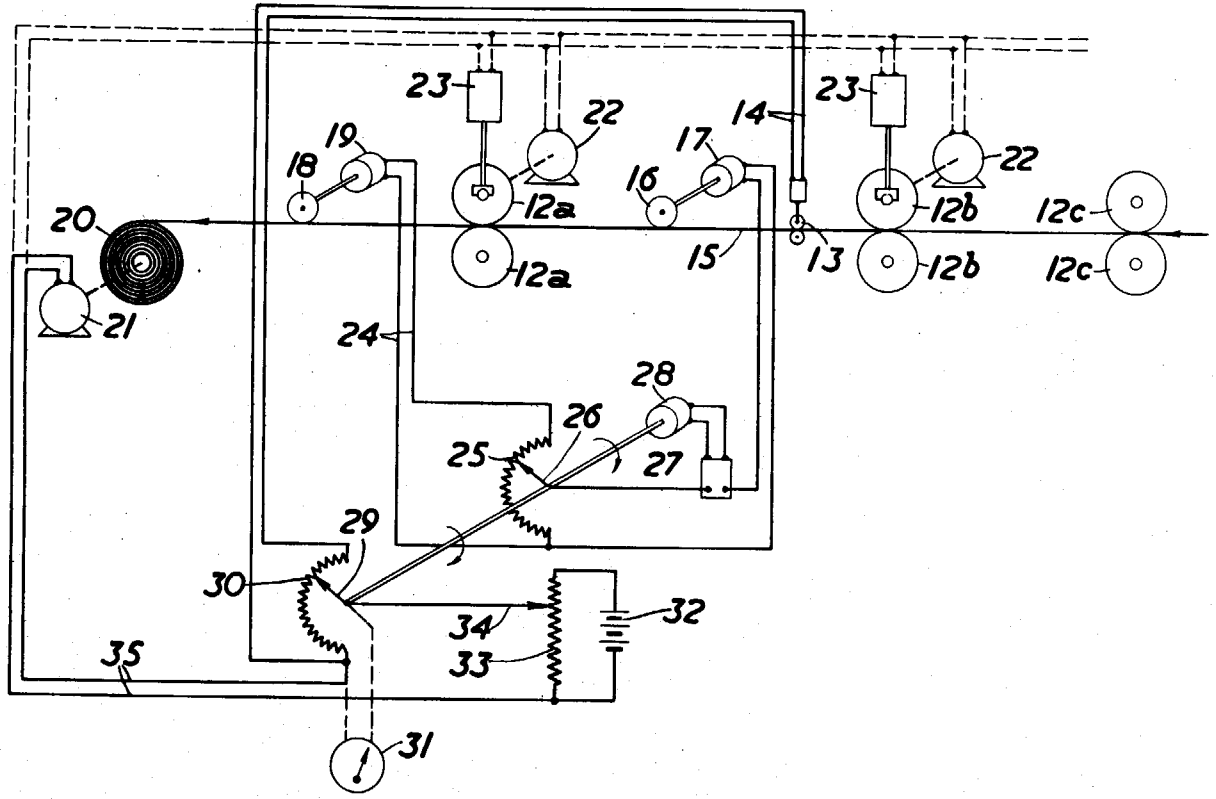
INVENTOR
WILFRED CECIL FREDERICK HESSENBERG
BY Frederick E. Hanes
ATTORNEY United States Patent Office Re. 25,075
Reissued Oct. 31, 1961

25,075
ROLLING MILLS

Wilfrid Cecil Frederick Hessenberg, Bromley, England, assignor to The British Iron & Steel Research Association, London, England Original No. 2,851,911, dated Sept. 16, 1958, Ser. No. 483,910, Jan. 25, 1955. Application for reissue Sept. 13, 1960, Ser. No. 55,815
Claims priority, application Great Britain Jan. 26, 1954
10 Claims. (Cl. 80—32)

Matter enclosed in heavy brackets [ ] appears in the original patent but forms no part of this reissue specification; matter printed in italics indicates the additions made by reissue.

This invention relates to rolling mills, particularly for steel. Rolling mills may be so arranged that the rolled material is passing through a number of individual roll stands at the same time. The continuous strip mill in which the strip passes simultaneously through several stands arranged in tandem is a well known example. One of the objects of continuous rolling is to produce long lengths of material having a desired cross-section which varies as little as possible from one end to the other. In a tandem strip mill changes in thickness may occur as the result of disturbances in one or more of the roll stands and it is desirable that these should be corrected before the material issues from the last stand. An object of this invention is to provide a method for achieving this.

It is a characteristic of continuous mills that, unless the material is allowed to accumulate between the stands or is subjected to increasing and finally destructive tensile stresses, the rate in volume units per second at which material leaves one stand must equal the rate at which it enters the next. It is also well known that in the rolling of metals their density is not appreciably affected by the deformation they receive. It is therefore possible to state that in a continuous mill where the material neither accumulates nor is subjected to increasing tension between the stands, the volume of material passing any point in a given time is the same for all points throughout the system. In the special case of a wide strip mill where the width of the strip is not affected by rolling, the thickness of the strip multiplied by the speed of the strip will yield the same product at any point. This product is the output of the mill.

The present invention employs the above features to provide apparatus for measuring the issuing thickness of strip from a rolling mill and for controlling the mill to maintain a strip thickness at a desired value. Thus, according to the present invention, in a method of measuring the thickness of strip leaving a rolling mill, the outgoing thickness is derived from measurement of the speed and thickness of the strip prior to passage out of the mill and of the speed of the strip leaving the mill. For a multi-stand mill, the speed and thickness is measured between any two adjacent stands so that the output can be derived; the output is then compounded with the speed of the strip leaving the mill to give an indication of the issuing strip thickness.

The invention includes apparatus for maintaining at the desired value the thickness of wide strip leaving a multi-stand rolling mill comprising means for producing signals in accordance with the speed ($v_1$) and the thickness ($h_1$) of the strip between two adjacent stands of the mill, means for producing a signal in accordance with the speed of the strip ($v_2$) leaving the mill, means for compounding the said signals to produce a resultant signal, representing the issuing thickness, in accordance with $$\frac{v_1 h_1}{v_2}$$

and means controlled by the resultant signal for maintaining the issuing thickness at the desired value.

The invention will be more readily understood by way of example from the following description of a continuous multi-stand steel rolling mill, reference being made to the accompanying drawing which is a schematic representation of the mill.

In the drawing, the rolls of the stands of the mill are indicated at 12a, 12b, 12c, etc., it being understood that the mill may have as many stands as may be desirable. Between any two adjacent stands, there are located a micrometer 13 which gives an electrical signal on the output lines 14 in accordance with the thickness of the strip 15 between those stands, and a device for giving an electric signal proportional to the linear speed of the strip as it passes between the stands. This device consists of a disc 16 mounted on the rotor of a tachometric generator 17, the arrangement being such that the plane of the disc 16 is aligned with the direction of motion of the strip 15 and the disc rotates at the same peripheral speed as the strip. The micrometer 13 and the device 16, 17 are shown between the last two stands of the mill, but it will be understood that they may be located between any two other stands.

A second device for measuring the speed of the strip is located at the issuing side of the last roller stand 12a. This device is similar to the device 16, 17 and comprises a disc 18 in frictional contact with the strip and carried on the motor of a tachometric generator 19.

The mill is provided with the customary reeling drum 20 for the strip, the reeler motor 21 and a driving motor 22 and screw-down motor 23 for each of the roller stands; the driving motor 22 drives the rolls, whereas the screw-down motor 23 causes adjustment in the initial setting of the work rolls 12 in relation to one another.

The output of generator 19 appearing at lines 24 is applied across an arcuate potentiometer 25. The signal appearing between the slider 26 of the potentiometer and one end of the potentiometer is applied in series opposition to the output from generator 17 to the input of a high gain amplifier 27, the output from which is connected to a light motor 28. The rotor shaft of motor 28 carries the slider 26 of potentiometer 25 and also the slider 29 of a second arcuate potentiometer 30. The electric signal appearing on the output lines 14 of micrometer 13 is applied across potentiometer 30 and the signal appearing on the slider 29 and one end of the potentiometer is proportional to the outgoing thickness of the strip and an indication of that thickness can be given by connecting the two points to a meter 31.

Alternatively, a signal may be derived proportional to the deviation of the issuing thickness from a given value by connecting slider 29 and one side of the potentiometer 30 in series opposition to a source of voltage indicated in the drawing as a battery 32 connected across the potentiometer 33. The slider arm 29 is connected to the slider 34 of potentiometer 33 and the difference voltage appears on lines 35.

In order to provide an automatic control system for maintaining the issuing thickness of the strip substantially at a given value determined by the setting of the potentiometer 33, the signal appearing on lines 35 may be applied to the reeler motor 21, as shown, or alternatively to any of the screw-down motors 23 of the roll stands or to any of the drive motors 22, as indicated in chain line.

The operation of the system is as follows. If the speed and thickness of the strip between stands 12a and 12b are $v_1$, $h_1$ and the speed and thickness of the strip, as it leaves the mill, are $v_2$ and $h_2$, then the voltage applied across potentiometer 25 is $V_2$ proportional to $v_2$ and the voltage appearing between slider arm 26 and one end of the potentiometer is $kV_2$ where k is determined by the position of the slider on the potentiometer. The voltage applied *to* the input of amplifier 27 is therefore proportional to $(V_1-kV_2)$ where $V_1$ is proportional to $v_1$ *and* as the gain of the amplifier 27 is large the angular position of rotor shaft of motor 28 will be $$\frac{v_1}{v_2}=\frac{V_1}{V_2}$$

since at balance the input to the amplifier will be very nearly zero. Thus, as the voltage applied across potentiometer 30 is proportional to $h_1$, the signal appearing at the slider 29 and one end of the potentiometer 30 is proportional to $$h_1\frac{v_1}{v_2}$$

and because the output for wide strip is constant along the whole length of the strip and therefore $h_1v_1=h_2v_2$, this signal is proportional to $h_2$, the issuing thickness of the strip and the meter 31 will indicate that thickness.

When used, the potentiometer 33 applies a constant voltage h in opposition to the voltage from potentiometer 30 and the signal appearing at output lines 35 is therefore $h_2-h$, the deviation of the thickness from a given value. When this voltage is applied to control any of motors 21, 22 or 23, the rolling mill will operate to maintain the output signal on lines 35 zero or, in other words, the issuing thickness of the strip at the desired value h, determined by the position of the slider 34.

As will be appreciated, the system illustrated in the accompanying drawing enables the thickness or gauge of the strip leaving the mill to be measured indirectly with the attendant advantage that the strip thickness is measured as it leaves the last roll stand and not at some distance from that stand. This advantage is of particular value when the system is used for automatic control of the mill as it enables irregularities in the thickness to be compensated immediately instead of after a time lag.

In another embodiment, the micrometer and the two speedometers are employed as before, but in this case percentage variations are measured. The signals from the micrometer and speedometer located between the stands are compounded to give a resultant signal equal to the output $(v_1\times h_1)$. From this resultant signal is obtained a signal proportional to the percentage variation of the output from a given value, the given value corresponding to a desired thickness. Similarly, the signal from the speedometer measuring the speed of the issuing strip is modified to give a signal proportional to the percentage variation in the issuing strip [thickness] *speed* from the given value, again corresponding to the desired thickness. The two percentage signals are applied in series opposition to give a difference signal proportional to the percentage variation of the issuing thickness of the strip from the desired value. This signal can be applied to the reeling motor or to the screw-down or driving motors of the stands to compensate automatically for variations in the thickness and to maintain that variation zero.

As a result of the adjustments in accordance with the percentage variation signal, there will occur changes in the tensions in the strip between the stands, which will bring the whole system into a new equilibrium. Changes in the thickness arising anywhere in the mill will be offset by the effects of these changes in tension on the strip thickness in such a way that there will be no resultant change in the thickness of the strip as it leaves the final stand.

What is claimed, is:

1. In a rolling mill having a motor operated final stand and at least one motor operated preliminary stand, manually adjustable means for [controlling] *setting* the thickness of the strip issuing from said final stand, first variable signal generating means responsive to the velocity of a partially finished strip supplied to said final stand, second variable signal generating means responsive to the thickness of said strip supplied to said final stand, third variable signal generating means responsive to the velocity of the strip issuing from said final stand, and a signal correlating means responsive to the setting of said manually adjustable means and all of said signal generating means, said correlating means [varying the speed of operation of said final stand motor so as to maintain the product of the thickness and velocity of said issuing strip constant to the product of the thickness and velocity of said supplied strip.] *controlling said mill to adjust the thickness of the strip issuing from said final stand substantially to the value set by said manually adjustable means.*

2. A rolling mill as set forth in claim 1, wherein said signal correlating means comprises a motor having a rotor, the position of said rotor being adjustable in response to changes in the [difference between] *quotient of* the signals produced by said first and third signal generating means, and a potentiometer having a slider coupled to said rotor, said second signal generating means comprising a source of voltage across said potentiometer, [the difference in the signals generated by said first and third signal generating means being detectable across said slider and one terminal of said potentiometer.] *the voltage drop across one terminal and said slider being applied in opposition to the setting of said manually adjustable means for controlling said mill.*

3. A rolling mill as set forth in claim 2, further comprising a second potentiometer, said [first] *third* signal generating means being connected across said second potentiometer, said second potentiometer having a slider connected to said rotor and a high gain amplifier connected [across one terminal and] *to* said slider of said second potentiometer, the voltage drop across one terminal and said slider of said second potentiometer being applied [to the input of said high gain amplifier for controlling said final stand motor.] *in opposition to the signal from said first generating means to the input of said high gain amplifier, and the output of said amplifier controlling said motor having said rotor.*

*4. In a rolling mill having a motor operated final stand, at least one motor operated preliminary stand, and reeling means for drawing strip through said stands, manually adjustable means for setting the value desired for the thickness of the strip issuing from said final stand, first variable signal generating means responsive to the velocity of a strip supplied to said final stand, second variable signal generating means responsive to the thickness of said strip supplied to said final stand, third variable signal generating means responsive to the velocity of the strip issuing from sand final stand, and a signal correlating means responsive to the setting of said manually adjustable means and all of said signal generating means, said correlating means controlling said reeling means to control the thickness of strip issuing from said final stand substantially to the value set by said manually adjustable means.*

*5. In a rolling mill having a motor operated final stand, at least one motor operated preliminary stand, reeling means for drawing strip through said stands, and means for controlling the separation of the rolls of at least one of said stands, manually adjustable means for setting the value desired for the thickness of strip issuing from said final stand, first variable signal generating means responsive to the velocity of a strip supplied to said final stand, second variable signal generating means responsive to the thickness of said strip supplied to said final stand, third variable signal generating means responsive to the velocity of the strip issuing from said final stand, and a signal correlating means responsive to the setting of said manually adjustable means and all of said signal generating means, said correlating means controlling said controlling means to adjust the thickness of the strip issuing from said*

*final stand to the value set by said manually adjustable means.*

*6. In a rolling mill having a motor operated final stand, at least one motor operated preliminary stand and reeling means for drawing strip through said stands, manually adjustable means for setting the value desired for the thickness of strip issuing from said final stand, first variable signal generating means responsive to the velocity of a strip supplied to said final stand, second variable signal generating means responsive to the thickness of said strip supplied to said final stand, third variable signal generating means responsive to the velocity of the strip issuing from said final stand, and signal correlating means responsive to the setting of said manually adjustable means and all said signal generating means, said correlating means automatically varying the speed of operation of one of the motors of one of said stands to adjust the thickness of the strip issuing from said final stand to the value set by said manually adjustable means.*

*7. In a rolling mill having at least one motor operated stand, an automatic control system for maintaining the thickness of the strip at a required value comprising means for measuring the thickness of the strip at the entry side of the stand and for generating a first signal representing that thickness, means for generating a second signal representing the quotient of the velocities of the strip at the two sides of the stand, correlating means controlled by the first and second signals for generating an error signal indicative of the departure from a required value of the thickness of the strip leaving the stand, and control means controlled by the error signal for controlling the thickness of the strip leaving the stand.*

*8. In a rolling mill having at least one motor operated stand, reeling means for drawing strip through said stand, and means for controlling the separation of the rolls of said stand, manually adjustable means for setting the value desired for the thickness of the strip issuing from the stand, first signal generating means responsive to the thickness of the strip supplied to said stand for generating a first signal representing that thickness, second generating means for generating a second signal representing the quotient of the velocities of the strip at the two sides of the stand, correlating means responsive to said manually adjustable means and said first and second signals for generating an error signal indicative of the departure from said desired value of the thickness of the strip leaving said stand, and means for applying said error signal to said means controlling the separation of said rolls, to maintain said error signal substantially zero.*

*9. In a rolling mill having at least one motor operated stand, reeling means for drawing strip through said stand and control means for controlling the reeling means, manually adjustable means for setting the value desired for the thickness of the strip issuing from said stand, first generating means responsive to the thickness of the strip supplied to said stand for generating a first signal representing that thickness, second generating means for generating a second signal representing the quotient of the velocities of the strip at the two sides of the stand, correlating means responsive to said manually adjustable means and said first and second signals for generating an error signal indicative of the departure from said desired value of the thickness of the strip leaving the stand, and means for applying said error signal to said control means to maintain said error signal substantially zero.*

*10. In a rolling mill having at least one motor operated stand and means for drawing strip through said stand, first variable signal generating means responsive to the velocity of strip supplied to said stand, second variable signal generating means responsive to the thickness of said strip supplied to said stand, third variable signal generating means responsive to the velocity of the strip issuing from the mill, correlating means responsive to all said generating means for generating an error signal indicative of the departure from a required value of the thickness of the strip issuing from said mill control means for controlling the thickness of the strip issuing from said mill, and means applying said error signal to said control means.*

References Cited in the file of this patent or the original patent

UNITED STATES PATENTS

| | | |
|---|---|---|
| 1,977,619 | Boyer | Oct. 23, 1934 |
| 2,051,018 | Umansky | Aug. 11, 1936 |
| 2,137,611 | Hetler | Nov. 22, 1938 |
| 2,264,095 | Mohler | Nov. 25, 1941 |
| 2,275,509 | Dahlstrom | Mar. 10, 1942 |
| 2,281,083 | Stoltz | Apr. 28, 1942 |
| 2,297,812 | Stoltz | Oct. 6, 1942 |
| 2,303,596 | Zeitlin | Dec. 1, 1942 |
| 2,332,272 | Shayne | Oct. 19, 1943 |

FOREIGN PATENTS

| | | |
|---|---|---|
| 533,162 | Great Britain | Feb. 7, 1941 |